(12) United States Patent  
Sanchez, II et al.

(10) Patent No.: US 7,107,595 B2  
(45) Date of Patent: Sep. 12, 2006

(54) MECHANISM FOR MAPPING JAVA OBJECTS ONTO AN LDAP REPOSITORY

(75) Inventors: Humberto A Sanchez, II, Ft Collins, CO (US); Miha Wang, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 09/827,035

(22) Filed: Apr. 5, 2001

(65) Prior Publication Data

US 2002/0147857 A1    Oct. 10, 2002

(51) Int. Cl.  
*G06F 9/46* (2006.01)

(52) U.S. Cl. .............................. 719/316; 707/1; 707/6; 707/103 Y

(58) Field of Classification Search .............. 707/1–10, 707/100–104.1, 103 Y; 719/316, 331–332, 719/328  
See application file for complete search history.

(56) References Cited

U.S. PATENT DOCUMENTS

| | | | | |
|---|---|---|---|---|
| 5,678,045 A | * | 10/1997 | Bettels | 707/200 |
| 6,240,422 B1 | * | 5/2001 | Atkins et al. | 707/102 |
| 6,305,007 B1 | * | 10/2001 | Mintz | 717/116 |
| 6,366,954 B1 | * | 4/2002 | Traversat et al. | 709/220 |
| 6,643,652 B1 | * | 11/2003 | Helgeson et al. | 707/10 |
| 2001/0034733 A1 | * | 10/2001 | Prompt et al. | 707/102 |

* cited by examiner

*Primary Examiner*—William Thomson  
*Assistant Examiner*—Phuong N. Hoang

(57) ABSTRACT

A method and apparatus for dynamically storing objects of an object-oriented programming application in a LDAP repository so that useful information from the objects may be read by other applications are disclosed. Embodiments of the method preferably comprise dynamically determining persistent attributes, which are a subset of each object's attributes, for each object being stored and mapping the persistent attributes to LDAP attributes in the LDAP repository. Embodiments of the invention preferably comprise a persistent data manager that is a component of the object-oriented programming application and that acts as an interface to the LDAP repository, storing objects in the LDAP repository when requested. The objects may be Java objects.

13 Claims, 9 Drawing Sheets

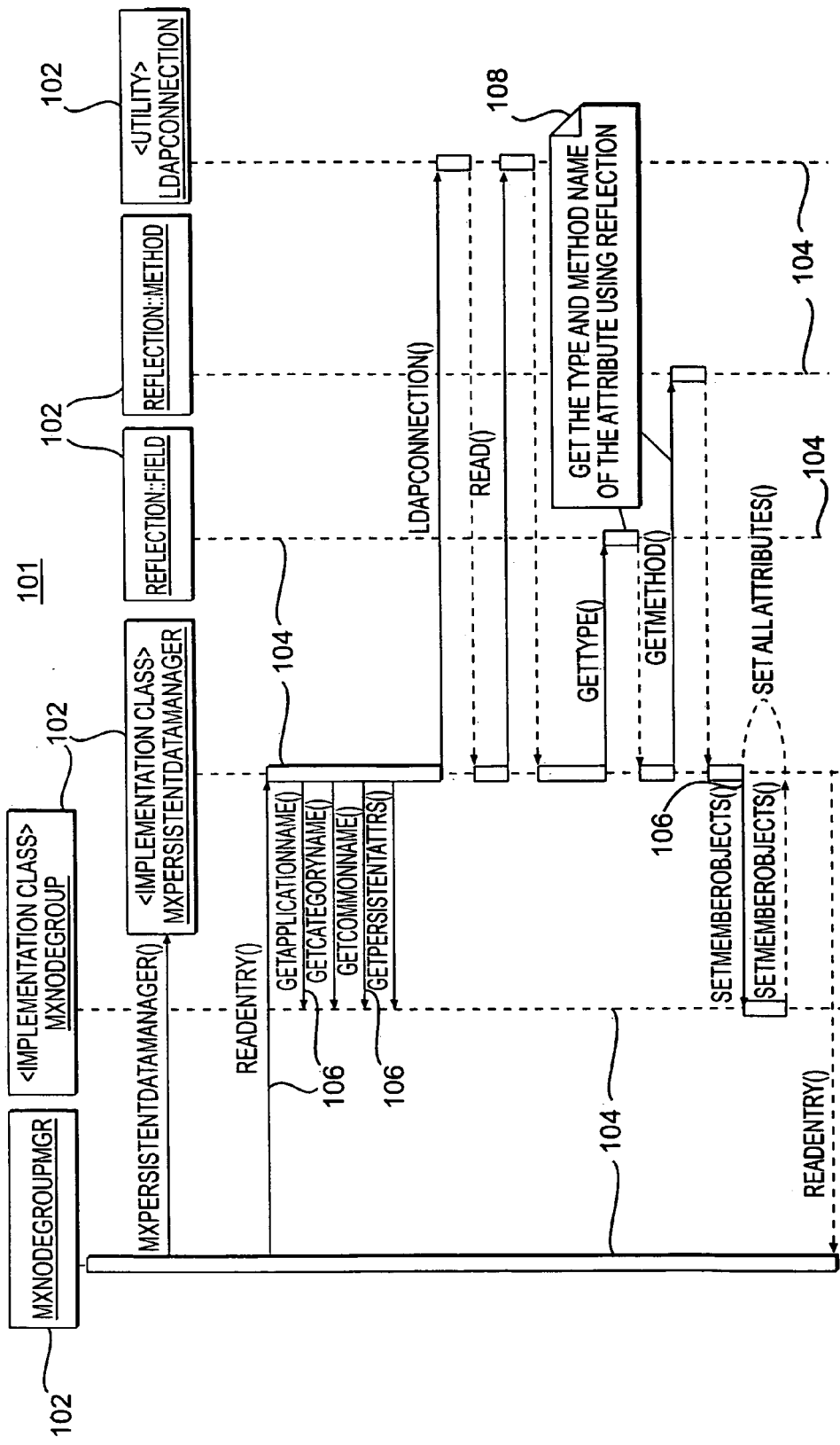

MECHANISM FOR MAPPING JAVA OBJECTS ONTO AN LDAP REPOSITORY

FIELD OF THE INVENTION

The invention relates to data storage, and more specifically to standardized storage of object attributes.

BACKGROUND OF THE INVENTION

Object-oriented programming is a method of programming that pairs programming tasks and data into re-usable chunks known as objects. Each object comprises attributes (i.e., data) that define and describe the object. Java classes are meta-definitions that define the structure and characteristics for groups of objects in object-oriented parlance. Java classes when instantiated create instances of the Java classes and are then considered Java objects. Methods within Java objects are used to get or set attributes of the Java object and to change the state of the Java object. Associated with each method is code that is executed when the method is invoked.

Java objects of an application, when instantiated, are resident within a computer's memory (e.g., ROM). However, when the computer is turned off or restarted, the objects are flushed from the memory. As such, the objects need to be loaded back into the computer's memory in order to be accessed. Consequently, there is a need for the objects and, particularly, the object attributes to be stored in persistent repository.

The Java objects may be stored as basic system files with a flat file structure. Basic systems files are a simple way of storing the Java objects that would be easily accessible to the application from which the Java objects originated. Unfortunately, other applications would need to learn the application's application programming interfaces ("APIs") in order to be able to access the object data from the basic system files. Having to learn these APIs is generally a deterrent that would effectively prevent the basic systems files from being usable outside of the originating application.

Storing the Java objects according to a standard protocol would seem to be a necessary improvement. Indeed, there are known methods for serializing Java objects and their attributes and storing them in a Lightweight Directory Access Protocol ("LDAP") repository. LDAP is an industry standard for storing information into a quickly accessible database. Serializing a Java object comprises converting the Java object's physical memory representation into a string of characters and storing the string of characters in the LDAP repository.

Unfortunately, simply serializing the Java objects and storing them in a LDAP repository does not make the stored Java objects readable or useable by other applications that do not have the same Java object structures. The string of characters has to be converted into the Java object from which it originated in order to be readable. Moreover, serializing the whole Java object necessarily stores attributes that are unimportant to other applications (e.g., attributes that represent internal operations of the Java object).

LDAP does include a plurality of data objects including different types of attributes (e.g., commonName, description, ipHostNumber, host, uidNumber). These LDAP data objects and their attributes, unfortunately, may not directly correspond to an application's Java objects and their attributes. In order to be usable, the LDAP data objects need to be mapped to Java objects. New LDAP data objects and attributes need to be created. If the Java objects are mapped to LDAP data objects, then the Java objects may be stored in a LDAP repository in a manner that is readable and useable by other applications.

SUMMARY OF THE INVENTION

A method and apparatus for dynamically storing Java objects in a LDAP repository in a manner useable to other applications are disclosed. According to an embodiment of the invention, a persistent data manager maps certain persistent attributes of Java objects to corresponding LDAP attributes. The certain persistent attributes are preferably chosen as attributes that are of interest to other outside applications. The LDAP attributes are named with a syntax that easily identifies the attributes. The persistent data manager is preferably a software component that executes processes to dynamically determine the persistent attributes of the Java objects as well as the path or distinguished name ("dn") of the corresponding LDAP attributes. The persistent data manager also preferably uses reflection, a known Java technique, to determine the persistent attribute values. The persistent data manager preferably invokes the LDAP API(s) necessary, either directly or indirectly through a utility class, to read and write the persistent attribute values from and to the LDAP repository.

These and other advantages are achieved by a method for mapping objects onto a lightweight directory access protocol repository, comprising requesting that an object be stored in a lightweight directory access protocol ("LDAP") repository, wherein the object includes attributes and is used in an object-oriented programming application, retrieving a list of persistent attributes from the object, wherein the persistent attributes are a subset of the attributes and the persistent attributes each comprise a persistent attribute value, determining a path, wherein the path identifies a location in the LDAP repository, retrieving the persistent attribute values from the object, and storing the object in the LDAP repository so that the persistent attributes are stored in a format that is useable to applications other than the object-oriented programming application.

Likewise, these and other advantages are achieved by a method for retrieving objects mapped onto a lightweight directory access protocol repository, comprising, requesting that an object be retrieved from a lightweight directory access protocol ("LDAP") repository, wherein the object includes attributes and is used in an object-oriented programming application, retrieving a list of persistent attributes from the object, wherein the persistent attributes are a subset of the attributes and the persistent attributes each comprise a persistent attribute value, determining a path, wherein the path identifies a location in the LDAP repository, retrieving the persistent attribute values from the location in the LDAP repository identified by the path, and setting the persistent attributes in the object with the retrieved persistent attribute values.

These and other advantages are also achieved by a computer readable medium containing instructions for mapping objects onto a lightweight directory access protocol repository, by requesting that an object be stored in a lightweight directory access protocol ("LDAP") repository, wherein the object includes attributes and is used in an object-oriented programming application, retrieving a list of persistent attributes from the object, wherein the persistent attributes are a subset of the attributes and the persistent attributes each comprise a persistent attribute value, determining a path, wherein the path identifies a location in the LDAP repository, retrieving the persistent attribute values from the object, and storing the object in the LDAP repository so that the persistent attributes are stored in a format that is useable to applications other than the object-oriented programming application.

A computer system that supports mapping objects onto a lightweight directory access protocol repository, comprising a lightweight directory access protocol ("LDAP") repository, a processor that runs an object-orient programming application, wherein the object-oriented programming application generates, an object, wherein the object includes attributes and is used in an object-oriented programming application, a persistent data manager, that acts as a layer between the object and the LDAP repository, wherein the persistent data manager stores the object in the LDAP repository by, retrieving a list of persistent attributes from the object, wherein the persistent attributes are a subset of the attributes and the persistent attributes each comprise a persistent attribute value, determining a path, wherein the path identifies a location in the LDAP repository, retrieving the persistent attribute values from the object, and storing the object in the LDAP repository so that the persistent attributes are stored in a format that is useable to applications other than the object-oriented programming application.

BRIEF DESCRIPTION OF THE FIGURES

FIGS. 6a and 6b are sequence diagrams illustrating exemplary processes for storing and reading a node group object in and from a LDAP data repository according to an embodiment of the present invention.

DETAILED DESCRIPTION OF THE INVENTION

Figure 1:
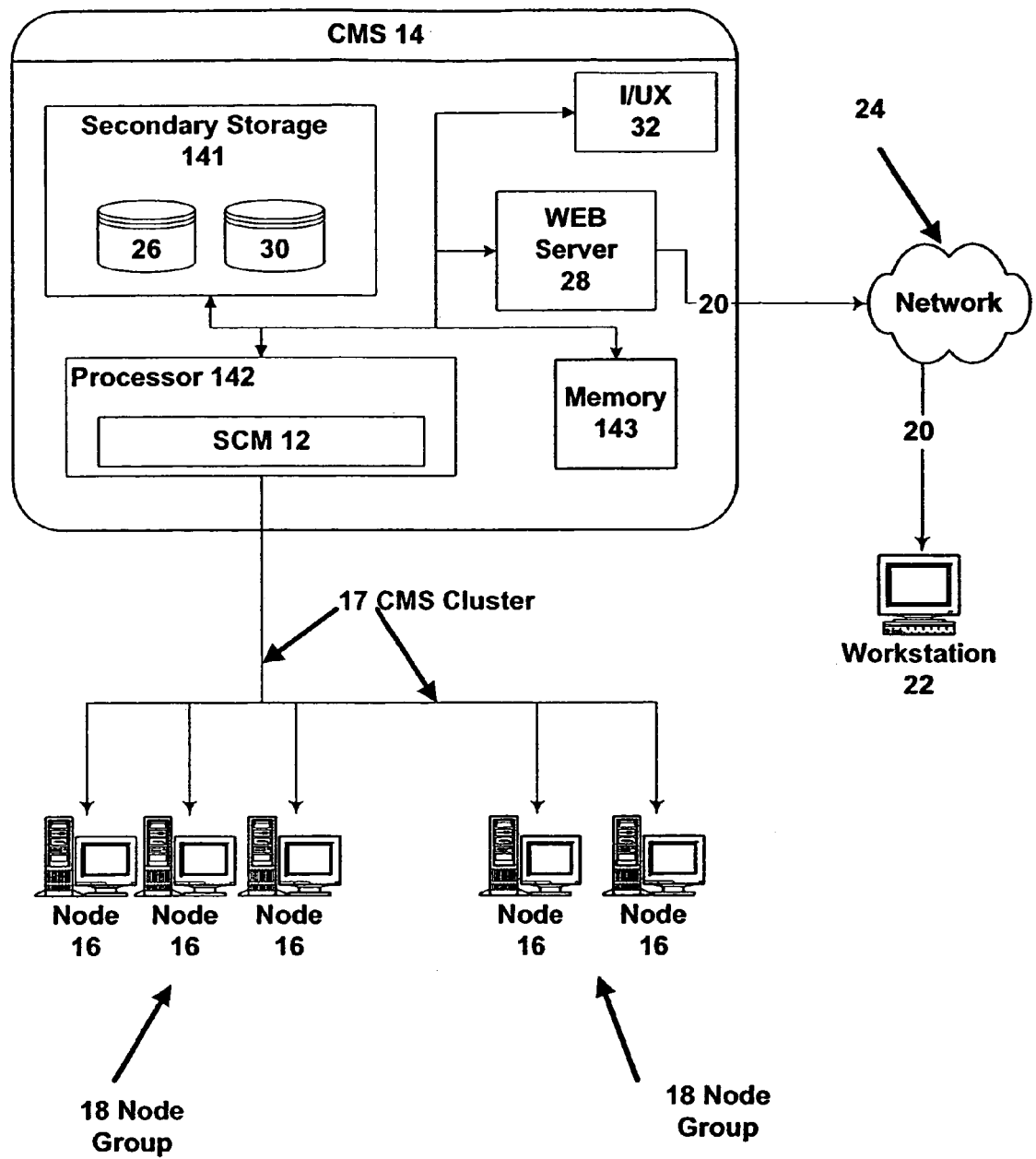
FIG. 1 is a block diagram of a network system in which an embodiment of the present invention is used.

The present invention may be used with computer systems that utilize object-oriented applications and need to store data (e.g., object attributes) in a format that is readable by different applications. FIG. 1 illustrates a computer network system 10 with which the present invention may be used. The network system 10 comprises a ServiceControl Manager ("SCM") 12 running on a Central Management Server ("CMS") 14 and one or more nodes 16 managed by the SCM on the CMS 14. Together the one or more nodes 16 managed by the SCM 12 make up an SCM cluster 17. A group of nodes 16 may be organized as a node group 18.

The CMS 14 preferably is an HP-UX 11.x server running the SCM 12 software. The CMS 14 includes a memory (not shown), a secondary storage device 141, a processor 142, an input device (not shown), a display device (not shown), and an output device (not shown). The memory, a computer readable medium, may include, RAM or similar types of memory, and it may store one or more applications for execution by processor, including the SCM 12 software. The secondary storage device 141, a computer readable medium, may include a hard disk drive, floppy disk drive, CD-ROM drive, or other types of non-volatile data storage.

The processor 142 executes the SCM 12 software and other application(s), which are stored in memory 143 or secondary storage 141, or received from the Internet or other network 24 in order to provide the functions and perform the methods described in this specification, and the processing may be implemented in software, such as software modules, for execution by the CMS 14 and modes 16. In addition to the that described above, the CMS 14 preferably also comprises a data repository 26 for the SCM cluster 17, a web server 28 that allows web access to the SCM 12 and a depot 30 comprising products used in the configuring of nodes, and a I/UX server 32.

Referring to FIG. 1, the SCM 12 preferably supports managing a single SCM cluster 17 from a single CMS 14. All tasks performed on the SCM cluster 17 are initiated on the CMS 14 either directly or remotely, for example, by reaching the CMS 14 via a web connection 20. Therefore, a workstation 22 at which a user sits may use a web connection 20 over a network 24 to the CMS 14 in order to perform tasks on the SCM cluster 17. The workstation 22 preferably comprises a display, a memory, a processor, a secondary storage, an input device and an output device.

The nodes 16 are preferably HP-UX servers or other servers and they may be referred to as "managed nodes" or simply as "nodes". The concept of a node 16 is that it represents a single instance of HP-UX running on some hardware. The node 16 may comprise a memory, a secondary storage device, a processor, an input device, a display device, and an output device.

Although the CMS 14 is depicted with various components, one skilled in the art will appreciate that this server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROMs; a carrier wave from the Internet or other network; or other forms of RAM or ROM. The computer-readable media may include instructions for controlling the CMS 14 (and/or the nodes 16) to perform a particular method, such as those described herein.

The SCM 12 is an application preferably programmed in Java that operates in a Java object-oriented environment. The SCM 12 comprises objects (e.g., Java objects) that provide the functionality of the SCM 12. In the system 10, each user, node, node group, role, tool, authorization, user name, node name, and node group name is, for each instance, represented by a single Java object. A role defines the role (e.g., administrator, database manager, web manager, etc.) a user may have on a certain node(s) or node group(s), where each role has one or more tools associated with it that a user with the role may execute. A tool is an executable(s) that performs a process. An authorization defines the node(s) and node group(s) a user is authorized to access and what roles the user has on the authorized node(s) or node group(s).

When the attributes of any of the above (i.e., user, node, node group, etc.) are changed or need to be accessed, the representative object is instantiated and a mutator (e.g., set) or accessor (e.g., get) method of the representative object is invoked. When a new user, node, node group, etc. is added, a new, empty representative object (e.g., a user object, node object, node group object, etc.) is instantiated and its attributes are then populated with the new user's, node's, node group's, etc. attributes.

Figure 2:
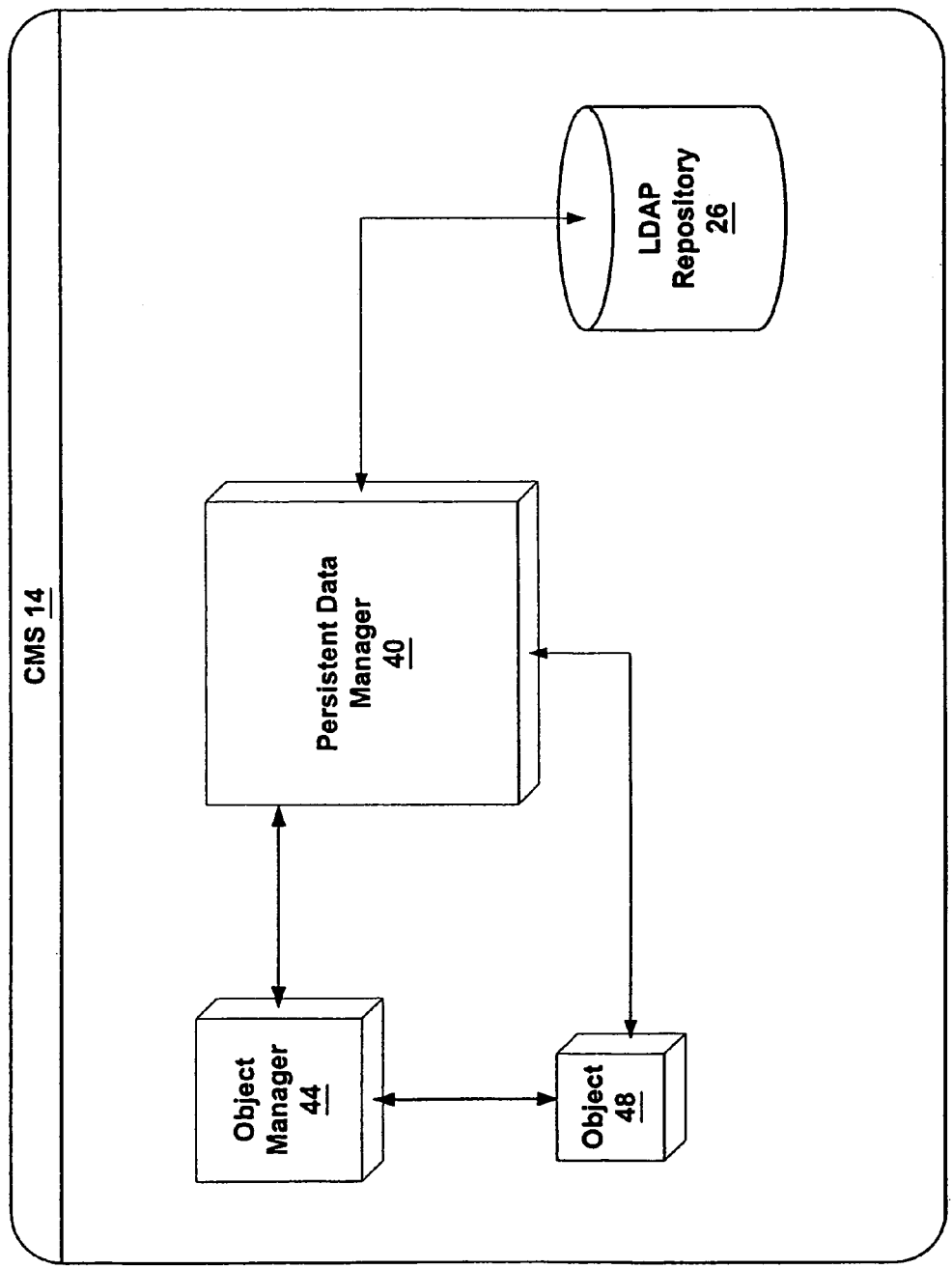
FIG. 2 is a block diagram conceptually illustrating a persistent data manager, and the persistent data manager's operation, according to an embodiment of the present invention.

The SCM 12 preferably stores these objects in the data repository 26. The data repository 26 preferably is a LDAP repository that is maintained in the secondary storage device 141 of the CMS 14. Accordingly, the SCM 12 preferably comprises an embodiment of the present invention, the persistent data manager 40, as illustrated in FIG. 2. The persistent data manager 40 is a software component that stores objects 48 in and reads the stored objects 48 from the LDAP data repository 26. Preferably, the LDAP data repository 26 is password-protected so that only the persistent data manager 40 may write to the LDAP data repository 26. The persistent data manager 40 acts as an interface to the LDAP data repository 26 for various consumers, such as object managers 44.

Referring to FIG. 2, in an embodiment of the present invention, a plurality of object managers 44 corresponding to each type of object (e.g., user, node, node group, etc.) interact with and direct the persistent data manager 40 to store the objects 48 in and read the stored objects 48 from the LDAP data repository 26. Object managers 44 preferably are software components that manage the objects 48, providing access to the objects 48 to various consumers and instantiating the objects when necessary.

Since objects 48 are defined by their attributes, the persistent data manager 40 stores objects 48 by storing persistent attributes of the objects 48 in the LDAP data repository 26. Accordingly, when directed to store an object 48 in the LDAP data repository 26, the persistent data manager 40 stores the persistent attributes in the LDAP data repository 26. Likewise, when directed to read a stored object 48 from the LDAP data repository 26, the persistent data manager 40 reads the persistent attributes from the LDAP data repository 26.

The persistent data manager 40 preferably stores the persistent attributes by mapping the persistent attributes to certain defined LDAP attributes. These LDAP attributes are preferably grouped within LDAP objects (not shown) that correspond to the objects 48. These LDAP objects and their attributes are defined within the LDAP data repository 26. In an embodiment of the present invention, the persistent data manager 40 is responsible for defining, in the LDAP data repository 26, most of the LDAP attributes and the LDAP objects that correspond to the objects 48. Some of the LDAP attributes may be standard LDAP attributes that already exist. These LDAP attributes and objects, referred to as persistent data schema, may be defined and created using known LDAP methods for creating LDAP attributes and objects.

The persistent data manager 40 may map the persistent attributes of the objects 48 to the LDAP attributes utilizing a simple mapping methodology. For example, the created LDAP attributes may be defined to have the same names as the persistent attributes with a simple prefix (or suffix or other notation) indicating a source (e.g., an organization and an application) from which the persistent attributes originate. For example, a time stamp attribute of an object 48, named "CreatedTime" may map to a created LDAP attribute named "hpmxCreatedTime." The prefix "hpmx" may indicate, for example, that the source organization is Hewlett-Packard Co.® and the source application is the SCM 12 (also known as MX or MUXPlex). As noted above, the persistent data manager 40 may map some of the persistent attributes to existing standard LDAP attributes (e.g., commonName, description, ipHostNumber, host and uidNumber).

Figure 3:
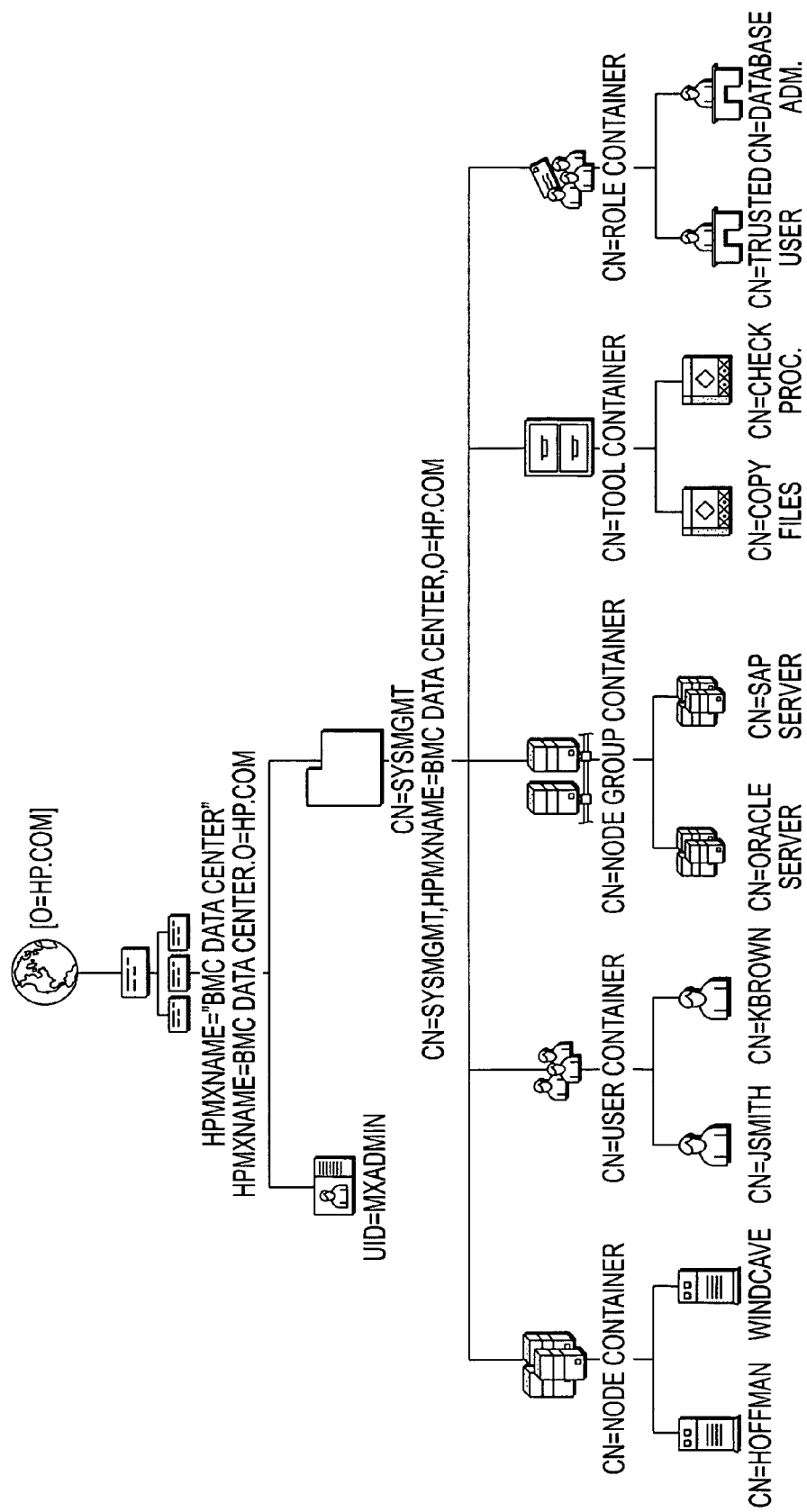
FIG. 3 is a directory tree illustrating an exemplary directory structure of a LDAP repository mapped to by a persistent data manager according to an embodiment of the present invention.

The LDAP data repository 26 preferably includes a standard LDAP directory structure. In an embodiment of the present invention, the persistent data manager 40 sets up the LDAP data repository 26, creating a directory structure for the source. For example, a file (e.g., a text file) may be sent to the persistent data manager 40 describing and defining the source application (e.g., SCM 12), which may be used for a main LDAP container, various container names, which may be sub-containers of the source application container and are preferably identified by object types, various LDAP objects, which preferably correspond to the objects 48 and are organized by the container names, and the LDAP attributes of these LDAP objects, which preferably correspond to the persistent attributes. The persistent data manager 40 may then parse the above information out of the file and set-up the LDAP data repository 26, creating the directory structure, the LDAP objects and LDAP attributes, using known, LDAP methods. A LDAP data repository 26 may be set up in this manner for each application for which it is used. FIG. 3 illustrates an exemplary directory structure or tree of a LDAP data repository 26 for the SCM 12 set up at the source organization Hewlett-Packard, Inc.®.

In the example shown, the LDAP data repository 26 is accessible via the Internet. Accordingly, the first level of the directory tree is o=hp.com, indicating a web-accessible directory of the Hewlett-Packard, Inc.® organization. The LDAP data repository 26 may be directly accessible from the first level of the directory tree. Accordingly, in the example shown, the LDAP data repository 26 is indicated by the second level named hpmxName="BMC Data Center." The LDAP syntax for the second level path or distinguished name ("dn") is, therefore, dn=hpmxName=BMC Data Center, o=hp.com.

In FIG. 3, the SCM 12 is referred to by an application commonName ("cn") "SysMgmt". Accordingly, a branch of the third level of the directory tree, identifying the source application, is named cn=SysMgmt, indicating that the objects 48 of the SCM 12 are stored, as described herein, within the SysMgmt container of the LDAP data repository 26. In other words, the LDAP objects and attributes to which the attributes of the objects 48 map are located within the SysMgmt container. The SysMgmt container preferably is password protected so that only the persistent data manager 40 may write to it. The LDAP syntax for this third level branch path is the distinguished name cn=SysMgmt, hpmxName=BMC Data Center, o=hp.com.

Preferably, the objects 48 are stored within different containers determined by the type of object 48. In other words, the LDAP objects and attributes to which the attributes of the objects 48 map are located within different containers determined by the type of the object 48. For example, as described above, the SCM 12 may comprise node, user, node group, tool and role objects. Accordingly, the directory tree shown in FIG. 3 includes a fourth level comprising containers (also known as groupOfNames). The containers shown include the following: cn=NodeContainer (for node objects); cn=UserContainer (for user objects); cn=NodeGroupContainer (for node group objects); cn=ToolContainer (for tool objects); and, cn=RoleContainer (for role objects). The LDAP syntax for the path of these containers is illustrated by the distinguished name cn=NodeContainer,cn=SysMgmt,hpmxName=BMC Data Center, o=hp.com.

Referring to FIG. 3, the fifth level of the directory tree shown includes specific LDAP objects corresponding to existing objects 48 that have been stored in the LDAP data repository 26 (i.e., existing objects 48 that have had their attributes mapped to LDAP attributes). FIG. 3 illustrates two exemplary objects for each container (i.e., for each object type). For example, the container cn=NodeContainer is shown including LDAP objects cn=hoffman and cn=windcave. These LDAP objects correspond to node objects 48 named hoffman and windcave. The LDAP syntax for the path of these LDAP objects is illustrated by the distinguished name cn=hoffman,cn=NodeContainer, cn=SysMgmt,hpmxName=BMC Data Center,o=hp.com.

Figure 4A:
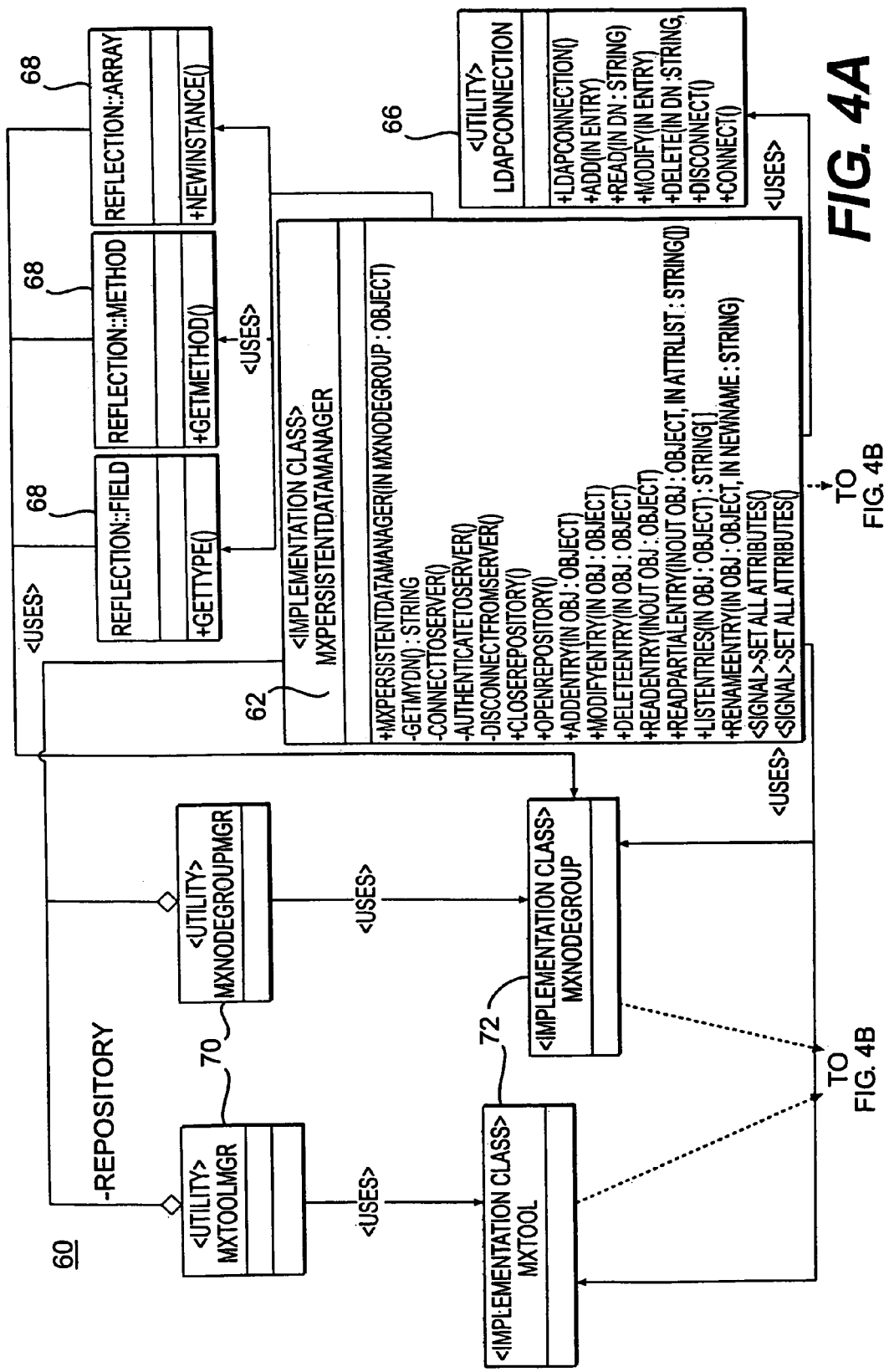
FIGS. 4a and 4b are a static structure diagram illustrating an implementation class of a persistent data manager, and operation of the persistent data manager, according to an embodiment of the present invention.
Figure 4B:
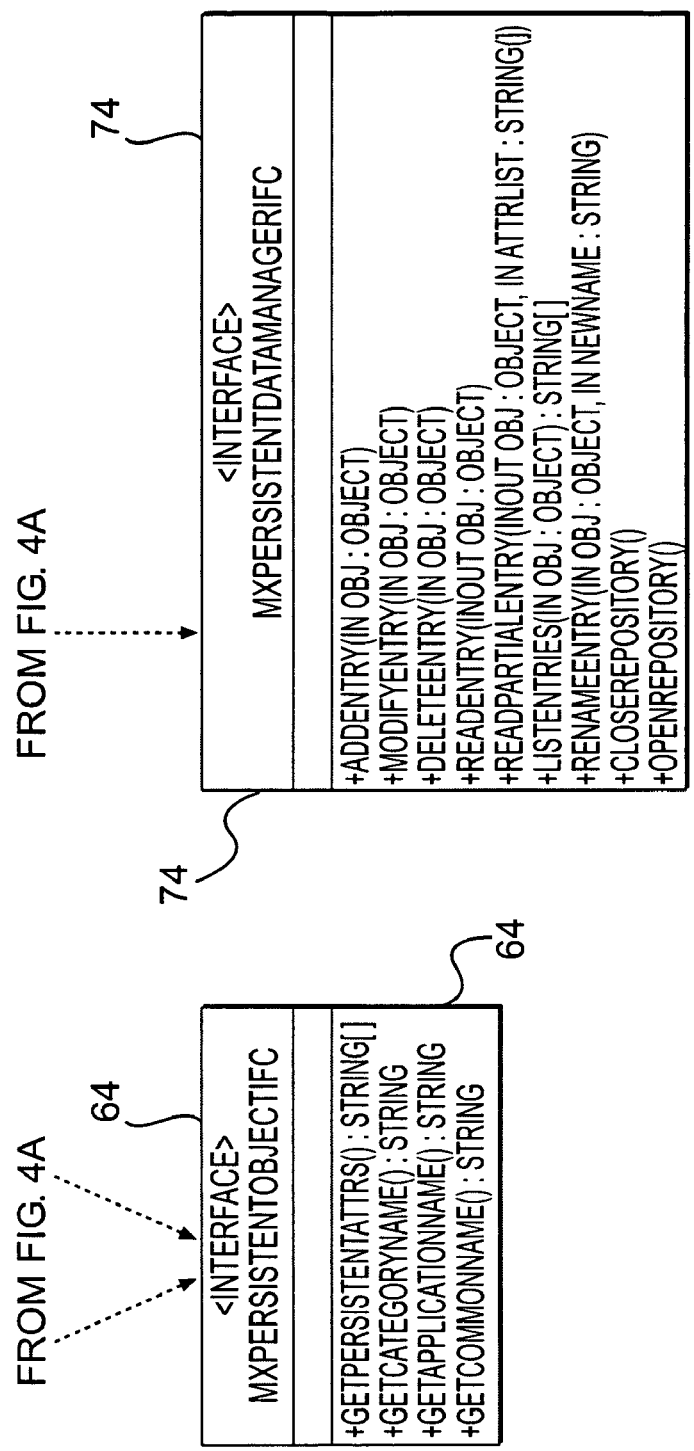

FIGS. 4a and 4b illustrate the interaction of the persistent data manager 40, object managers 44 (e.g., NodeGroup Manager and Tool Manager), objects 48 (e.g., NodeGroup and Tool objects) and certain interfaces and other classes implemented when one of the object managers 44 (e.g., NodeGroup Manager) requests the persistent data manager 40 to store or read one of the objects 48 (e.g., NodeGroup object) to or from the LDAP data repository 26. More specifically, FIGS. 4a and 4b illustrate an exemplary static structure diagram 60 of an persistent data manager ("PDM") implementation class 62 (e.g., MxPersistentDataManager) that is the public interface for consumers (e.g., object managers 44) of the persistent data manager 40, a persistent object interface 64 (e.g., MxPersistentObjectIfc) that preferably is implemented by any object 48 that is to be stored in the LDAP data repository 26, a LDAP utility class 66 (e.g., LDAPConnection) that the persistent data manager 40 uses to invoke standard LDAP methods for manipulating the LDAP data repository 26, a series of reflection classes 68 that the persistent data manager 40 uses to get or set the certain persistent attribute values from the objects 48, and object manager utility classes 70 and object implementation classes 72 that are instantiated as object managers 44 and objects 48.

The LDAP utility class 66 preferably comprises standard LDAP methods for adding, reading, modifying and deleting LDAP entries (e.g., LDAP objects and attributes) from a LDAP repository. The static structure diagram 60 also includes a data repository interface 74 (e.g., MxPersistentDataManagerIfc), as seen in FIG. 4b, that may be implemented if the data repository 26 is not an LDAP repository, but is some other type of repository (e.g., an Oracle® database). If the data repository 26 is, for example an Oracle database, the Oracle database preferably implements the MxPersistentDataManagerIfc.

The exemplary static structure diagram 60 in FIGS. 4a and 4b include subsets of the methods of the exemplary classes and interfaces illustrated. For example, the PDM implementation class 62 may include additional methods beyond those shown in FIG. 4a. Likewise, the PDM implementation class 62 may include less or different methods than the methods shown in FIG. 4a. Moreover, the names of the methods shown are not crucial to the implementation of the persistent data manager 40 and different names may be used for the same methods without deviating from the scope of the invention. In other words, the static structure diagram 60 is exemplary in nature.

The PDM implementation class 62 preferably comprises private methods, indicated by the "−" in front of the method names, and public methods, indicated by the "+" in front of the method names. The persistent data manager 40 uses the private methods internally. For example, the −connectToServer( ) method may be invoked by the persistent data manager 40 to connect to the LDAP data repository 26. The −connectToServer( ) method, when invoked, may in turn invoke a LDAP utility class 66 LDAP method +connect( ) to connect to the LDAP data repository 26. Likewise, a −disconnectFromServer( ) method may be invoked by the persistent data manager 40 to disconnect from the LDAP data repository 26 in the same manner. An −authenticateToServer( ) may be used to pass a LDAP data repository 26 password when the LDAP data repository 26 is password protected, as described above.

The public methods of the PDM implementation class 62 are preferably invoked by object managers 44 in order to store, delete, read, etc. the objects 48 in the LDAP data repository 26. Associated with each of these public methods is coding necessary to execute the processes described herein for performing these tasks. As FIG. 4a illustrates by the method invocation lines 75, the object managers 44 (represented by the object manager utility classes 70) invoke a public method of the PDM implementation class 62 when seeking to store an object 48 in the LDAP data repository 26. The public method of the PDM implementation class 62 in turn uses the objects 48 (represented by the object implementation classes 72), the series of reflection classes 68, and the LDAP utility class 66 to determine the names of the objects' 48 attributes that are supposed to be stored in the LDAP data repository 26 (i.e., the persistent attributes described above), to reflect the persistent attributes' values and to store the persistent attributes' values in the LDAP data repository 26. The reading of objects 48 from the LDAP data repository 26 is preferably implemented in a similar way, as described below.

As noted above, objects 48 that are to be stored in the LDAP data repository 26 preferably implement the persistent object interface 64. By implementing this persistent object interface 64, the objects 48 will return data requested by the "get" methods of the persistent object interface 64 when the persistent data manager 40 invokes these get methods. Accordingly, when an invoked public method of the PDM implementation class 62 uses the objects 48, as described above and shown in FIG. 4a, the persistent data manager 40 preferably invokes the persistent object interface 64 get methods shown in FIG. 4b. The invoked get methods return data identifying the persistent attributes, as well as data used to determine the LDAP data repository 26 directory path or dn for the objects 48 being stored. In other words, the persistent data manager 40 uses "reflection" on the objects 48 to get the objects 48 to "look in a mirror" and provide the requested data. Reflection is a known Java technique to determine an object's attributes in this manner.

For example, the getPersistentAttrs( ): String returns a lists of the persistent attributes for the object 48 to be stored, the getApplicationName( ): String returns a string identifying the source application (e.g., SysMgmt for the SCM 12) corresponding to the third level of the directory tree shown in FIG. 3, the getCategoryName( ) String returns a string identifying the container (e.g., Node Group Container) corresponding to the fourth level of the directory tree shown in FIG. 3 and getCommonName( ): String returns a string identifying an attribute of the object 48 that contains the name of the object 48. Preferably, the persistent data manager 40 uses a reflection (represented by a reflection class 68) to get the value of this name attribute of the object 48. The value of this name attribute of the object 48 (i.e., the name of the object 48) corresponds to a LDAP object in the to the fifth level of the directory tree shown in FIG. 3.

The persistent attributes and dn are dynamically determined each time an object 48 is stored in the LDAP data repository. By dynamically determining the persistent attributes and dn, the persistent data repository can store any object 48 passed to it. The persistent data manager 40 may be coded with the persistent attributes of each type of object 48. However, this would bloat the persistent data manager 40 with excess code and require that the persistent data manager 40 be re-coded any time a new object type was created or an existing object type modified (e.g., if additional attributes were added to the persistent attributes for a type of objects 48). By dynamically determining the persistent attributes, these disadvantages are avoided.

As noted above, the persistent data manager 40 uses reflection to retrieve the values of the persistent attributes. Accordingly, invoked public methods, of the PDM implementation class 62, instantiate the reflection classes 68 shown in order to reflect these values. Referring again to FIG. 4a, the reflection::Field reflection class 68 represents a reflection used to get the data type of each of the persistent attributes. Accordingly, a getType( ) method is invoked for each certain persistent attribute, with the name of each certain persistent attribute passed with the method invocation, to retrieve the data type of the certain persistent attribute. The data type is needed to avoid exceptions for mismatched data types (e.g., the persistent data manager 40 gets a String when a Long or Int is expected).

Referring to FIG. 4a, the reflection::Method reflection class 68 represents a reflection used to get method names that are invoked to get or set the persistent attributes of the objects 48. It is preferably a matter of convention that each of the objects 48 includes a pair of methods that allow the persistent data manager 40 to get or set the persistent attributes' values by adding the words "get" or "set" to each persistent attributes' name. Accordingly, a getMethod( ) method is invoked for each certain persistent attribute of an object 48, with the name of each certain persistent attribute passed with the method invocation, to generate series of get or set method objects (depending on whether a store or read is intended) for all of the persistent attributes. Once the get or set method objects are returned to the persistent data manager 40, the get or set methods are invoked to get or set the persistent attributes' values from or to the object 48.

Referring to FIG. 4a, the reflection::Array reflection class 68 represents a reflection used create an array for those persistent attributes that have multiple values (e.g., that are arrays). Since an array is an object in Java, the reflection::Array reflection class 68 comprises a newInstance( ) method that is invoked to create a new instance of an array object. Invoking the appropriate get or set method may then fill in the instantiated array object. The filled-in array object is passed to the object 48 or the LDAP data repository, depending on whether a read or store of the object 48 is intended.

Figure 5A:
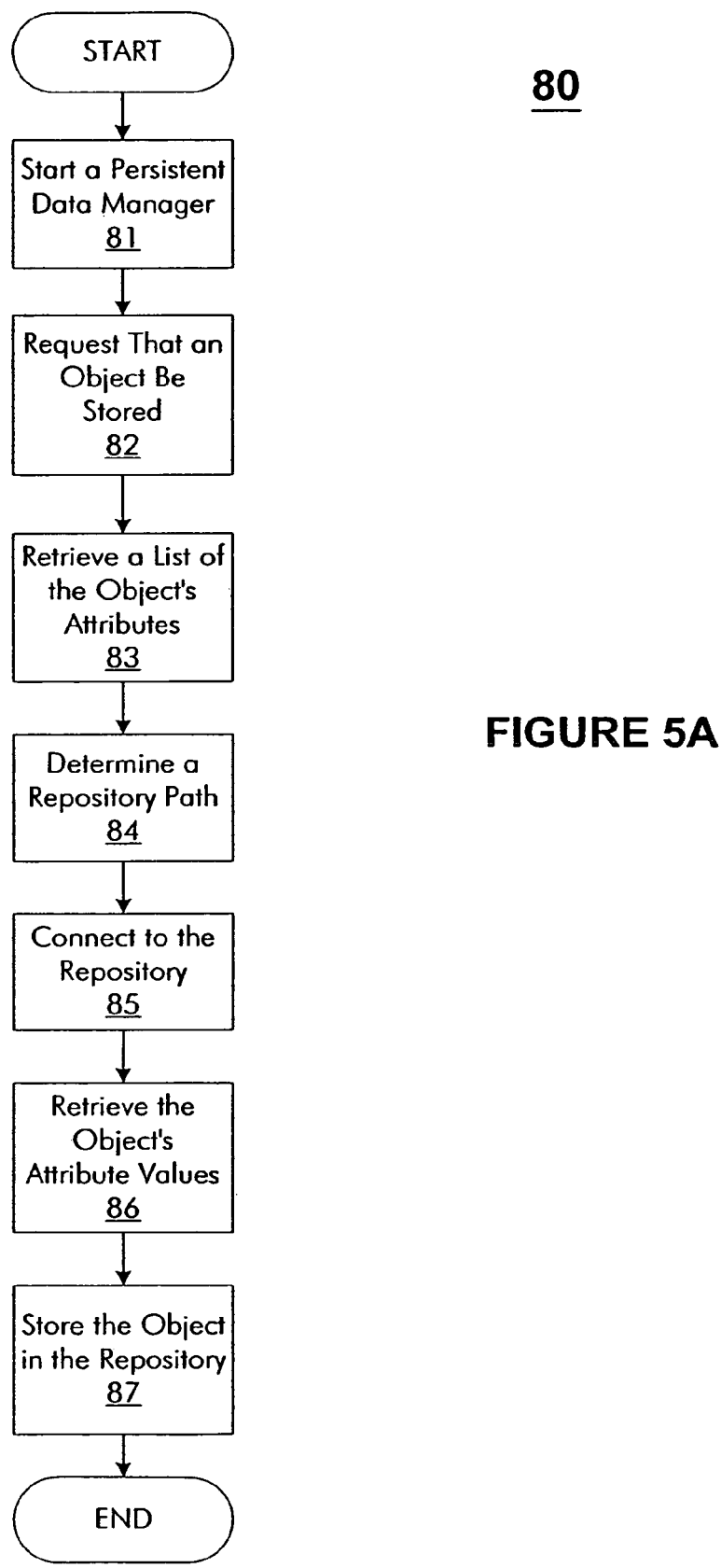
FIGS. 5a and 5b are flowcharts illustrating methods for storing and reading Java objects in and from a LDAP data repository according to an embodiment of the present invention.
Figure 5B:
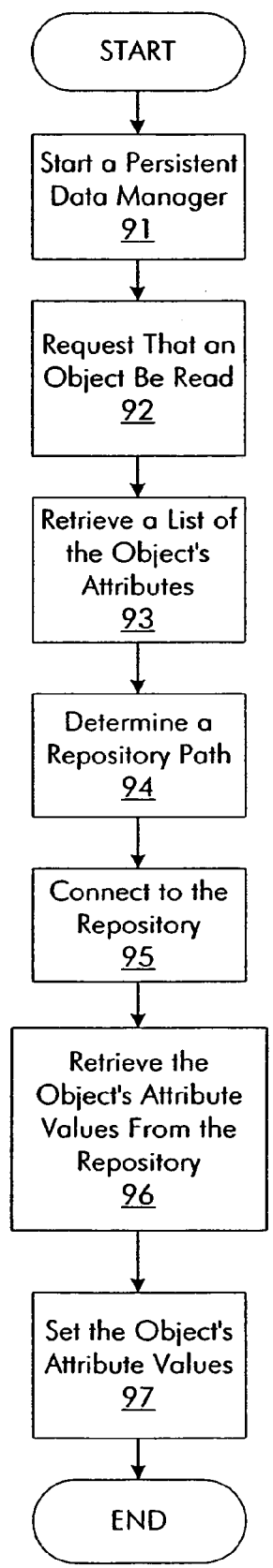

FIGS. 5a and 5b are flow-charts illustrating exemplary methods for storing and reading Java objects in a LDAP repository. As shown in FIG. 5a, the method 80 for storing Java objects in a LDAP repository comprises starting a persistent data manager 81, requesting that an object 48 be stored 82, retrieving a list of the object's attributes 83, determining a repository path 84, connecting to the repository 85, retrieving the object's attribute values 86 and storing the object in the repository 87. Starting a persistent data manager 81 preferably comprises an object manager 44 instantiating the PDM implementation class 62 or otherwise initiating the persistent data manager 81. The PDM implementation class 62 may be instantiated, for example, by invoking a PDM implementation class 62 constructor (e.g., MxPersistentDataManager( )).

Requesting that an object be stored 82 preferably comprises an object manager 44 requesting that a persistent data manager 40 store an object 48. The object manager 44 may accomplish this by invoking a PDM implementation class 62 method addEntry( ) (or "addObject") seen in FIG. 4a and passing the object 48 with the method invocation. When invoked, the addEntry( ) method preferably starts a process to store the object 48 in the LDAP data repository 26 and invokes the method steps described below.

Retrieving a list of the object's attributes 83 is preferably a step in the process started by the addEntry( ) method invocation; retrieving the list of the object's attributes 83 may be the first step. The list of the object's attributes preferably comprises the names of only those attributes of the object 48 that are to be stored in the LDAP data repository (i.e., the persistent attributes). Therefore, retrieving the list of the object's attributes 83 comprises the persistent data manager 40 retrieving the persistent attributes from the object 48, preferably by invoking the persistent object interface 64 method to get the persistent attributes (e.g., getPersistentAttrs( )). As noted above, an object 48 being stored in the LDAP data repository 26 preferably implements the persistent object interface 64 so that this method invocation will return the persistent attributes.

Determining a repository path 84 comprises determining the path, or dn, in the LDAP data repository 26 of the LDAP object that corresponds to the object 48 that is being stored. Since the path, or dn, of the LDAP object is preferably determined from information in the object 48, determining a repository path 84 preferably comprises the persistent data manager 40 retrieving the information from the object 48. Preferably, the persistent data manager 40 retrieves this information by invoking persistent object interface 64 methods to get the application name (e.g., getApplicationName( )), to get the container or category name (e.g., getCategoryName( )), to get the name of the object 48 (e.g., getCommonName( )).

As discussed above, these methods may actually retrieve the name of an attribute(s) of the object 48 that contains the object name, container name and/or application name. In such an implementation, the persistent data manager 40 may then retrieve the actual name(s) from the attribute(s) using reflection. The path, or dn, in a LDAP data repository 26 at Hewlett-Packard Co. Inc. may then be determined as dn=cn=CommonName (e.g., hoffman), cn=CategoryName (e.g., NodeContainer), cn=ApplicationName (e.g., SysMgmt), hpmxName=BMC Data Center, o=hp.com. The execution of steps 83 and 84 are basically the object 48 entering a contract with the persistent data manager 40 to store the persistent attributes at the determined dn in the LDAP data repository 26, and may be performed in any order (e.g., step 84 and then step 83).

Connecting to the repository 85 preferably comprises the repository data manager 40 connecting to the LDAP data repository 26. The repository data manager 40 may connect to the LDAP data repository 26 by invoking an internal connect to server method (e.g., connectToServer( )), which in turn invokes a LDAP utility class constructor method (e.g., LDAPConnection( )) instantiating the LDAP utility class 66, which in turn invokes a LDAP method (e.g. connect( )) to connect to the LDAP data repository 26. The connecting step 85 need not precede all of the following steps, but the connecting step 85 should precede storing the object in the repository 87.

Retrieving the object's attribute values 86 preferably comprises the persistent object manager 40 getting the value of each persistent attribute of the object 48 that is being stored. Preferably, the persistent object manager 40 retrieves the object's attributes' values using the reflection technique, described above with reference to FIGS. 4a and 4b. For example, the data type of each of the persistent attributes is determined via reflection, a get method object for each of the certain persistent attribute is created via reflection and the get method for each persistent attribute in the object 48 is invoked, thereby retrieving the value of each persistent attribute. If a persistent attribute is an array, an array object is instantiated and the values are retrieved into the instantiated array object.

Once the persistent attributes of the object 48 being stored are retrieved, the object 48 may be stored in the LDAP data repository 26. The persistent data manager 40 may map the persistent attributes to LDAP attributes by appending the simple pre-fix (or suffix or other notation) indicating the source onto the persistent attributes' names, as described above. For example, using the prefix described above, a createdBy persistent attribute maps to the LDAP attribute hpmxcreatedBy. Accordingly, storing the object 48 in the repository 87 preferably comprises the persistent data manager 40 passing the LDAP object and the dn for the LDAP object by mapping the persistent attributes to LDAP attributes, populating the LDAP attributes with the persistent attributes' value and passing the LDAP attributes and the dn to the LDAP data repository 26. The persistent data manager 40 may achieve this by directly invoking a LDAP API or by invoking a LDAP uitlity class 66 method to add an entry to the LDAP data repository 26 (e.g., add( )) and passing the LDAP object and dn for the LDAP object with this method invocation. The LDAP utility class 66 method in turn invokes the LDAP API to store the mapped object 48 in the LDAP data repository 26.

As shown in FIG. 5b, the method 90 for reading Java objects from a LDAP repository comprises starting a persistent data manager 91, requesting that an object 48 be read 92, retrieving a list of the object's attributes 93, determining a repository path 94, connecting to the repository 95, retrieving the object's attribute values from the repository 96 and setting the object's attribute values 97. Starting a persistent data manager 91 may be accomplished as described above with reference to FIG. 5a.

Requesting that an object 48 be read 92 preferably comprises an object manager 44 requesting that a persistent data manager 40 retrieve or load the object 48 from a LDAP data repository 26. The object manager 44 may accomplish this by invoking a PDM implementation class 62 method readEntry( ) (or "readObject") seen in FIG. 4a and passing an empty object 48 with the method invocation. When invoked, the readEntry( ) method preferably starts a process to read the object 48 from the LDAP data repository 26 and invokes the method steps described below.

Retrieving a list of the object's attributes 93 is preferably a step in the process started by the readEntry( ) method invocation; retrieving the list of the object's attributes 93 may be the first step in this process. The list of the object's attributes preferably comprises the names of only those attributes of the object 48 that are stored in the LDAP data repository 26 (i.e., the persistent attributes). Therefore, retrieving the list of the object's attributes 93 comprises the persistent data manager 40 retrieving the persistent attributes from the empty object 48, preferably by invoking the persistent object interface 64 method to get the persistent attributes (e.g., getPersustentAttrs( )). As noted above, an object 48 stored in the LDAP data repository 26, in this case the empty object 48, preferably implements the persistent object interface 64 so that this method invocation will return the persistent attributes.

Determining a repository path 94 comprises determining the path, or dn, in the LDAP data repository 26 of the LDAP object that corresponds to the empty object 48. Since the path, or dn, of the LDAP object is preferably determined from information in the empty object 48, determining a repository path 94 preferably comprises the persistent data manager 40 retrieving the information from the empty object 48. Preferably, the persistent data manager 40 retrieves this information by invoking persistent object interface 64 methods to get the application name (e.g., getApplicationName( )), to get the container or category name (e.g., getCategoryName( )), to get the name of the object 48 (e.g., getCommonName( )).

As discussed above, these methods may actually retrieve the name of an attribute(s) of the empty object 48 that contains the object name, container name and/or application name. In such an implementation, the persistent data manager 40 may then retrieve the actual name(s) from the attribute(s) using reflection. The path, or dn, in a LDAP data repository 26 at Hewlett-Packard Co. may then be determined as dn=cn=CommonName (e.g., hoffman), cn=CategoryName (e.g., NodeContainer), cn=ApplicationName (e.g., SysMgmt), hpmxName=BMC Data Center, o=hp.com. The execution of steps 93 and 94 are basically the object 48 entering a contract with the persistent data manager 40 to read the persistent attributes from the determined dn in the LDAP data repository 26, and may be performed in any order (e.g., step 94 and then step 93).

Connecting to the repository 95 may be accomplished as described above with reference to FIG. 5a. Referring again to FIG. 5b, retrieving the object's attribute values from the repository 96 preferably comprises the persistent data manager 40 reading the empty object's 48 persistent attributes' values from the LDAP data repository 26. This may comprise the persistent data manager 40 mapping the persistent attributes to LDAP attributes, as described above, passing the dn for the LDAP object, determined as described above in steps 93 and 94, to the LDAP data repository 26 and populating the mapped persistent attributes with the values of the corresponding LDAP attributes stored in the LDAP data repository 26. The persistent data manager 40 may achieve this by directly invoking a LDAP API or by invoking a LDAP uitlity class 66 method to read an entry from the LDAP data repository 26 (e.g., read( )) and passing the dn for the LDAP object with this method invocation. The LDAP utility class 66 method in turn invokes the LDAP API to read the LDAP attributes' values located by the dn from the LDAP data repository 26.

Once the values of the LDAP attributes corresponding to the persistent attributes of the empty object 48 have been read from the LDAP data repository 26, the empty object 48 may be populated with these values. Setting the object's attribute values 97 may comprise the persistent data manager 40 populating the persistent attributes with the LDAP attributes' values. As with the method described above with regard to FIG. 5a, Java reflection, or a similar technique, is preferably used to get the data types and method names of the persistent attributes. For setting the object's attribute values 97, the method names are "set" methods, since the persistent attributes are being set with the LDAP attributes' values. As above, if any of the persistent attributes are arrays, a reflection is preferably used to create an instance of an array object. Once the data types and method names are retrieved, the persistent data manager 40 preferably invokes the set methods to set each of the persistent attributes of the empty object 48 and populate the empty object 48.

Figure 6A:
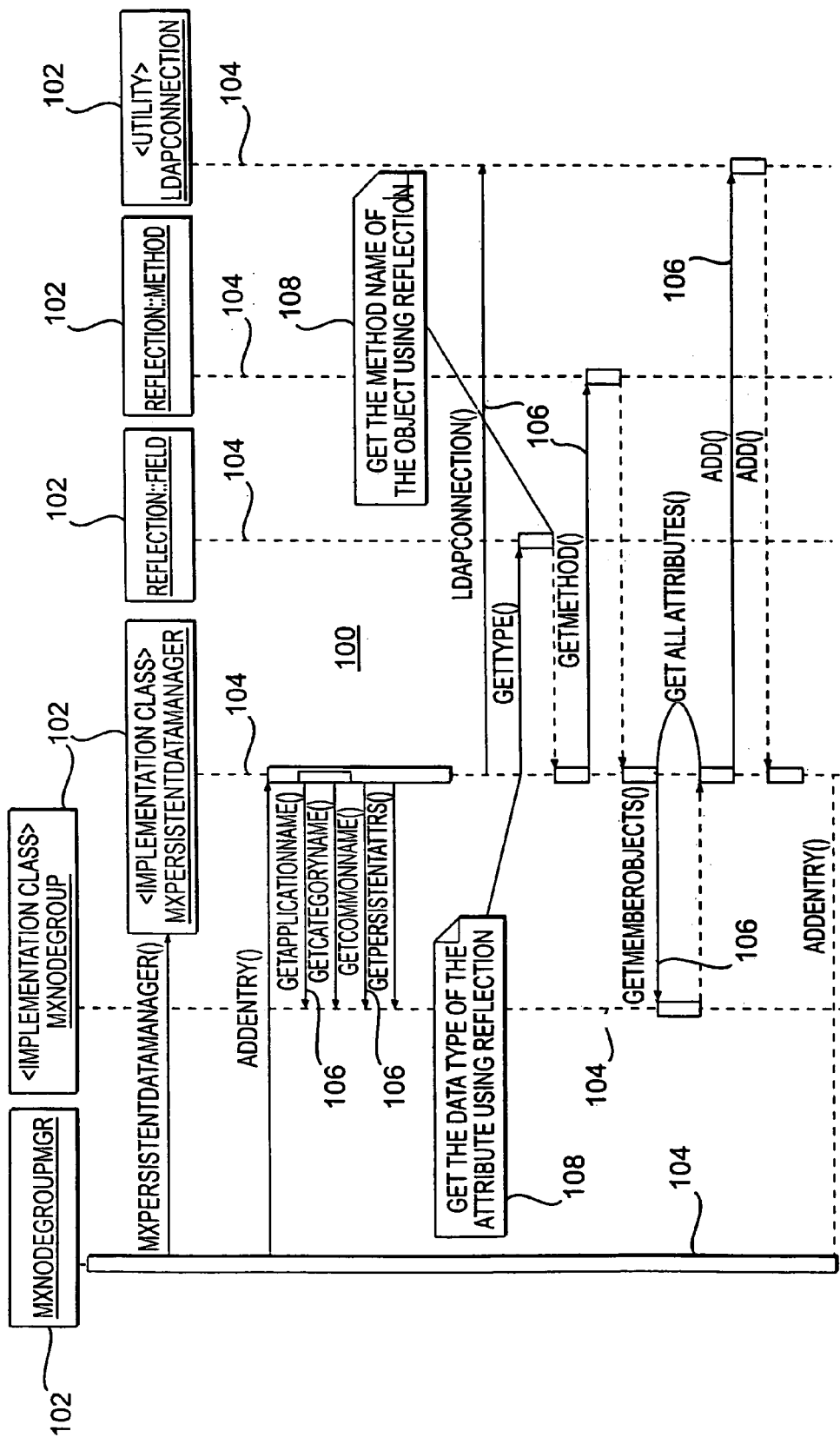

FIGS. 6*a* and 6*b* are exemplary sequence diagrams for storing a node group object in a LDAP data repository and reading a node group object from a LDAP data repository. These sequence diagrams illustrate exemplary methods for storing and reading objects to and from an LDAP data repository; methods similar to the method illustrated by these exemplary sequence diagrams may be used to store and read different types of objects to and from an LDAP data repository. Each sequence diagram comprises: boxes 102, each representing a class; vertical time-lines 104, each representing continuous running of a class; horizontal method call-lines 106, each representing a first class invoking a target class method; and notation boxes 108 including comments about the sequence diagrams.

FIG. 6*a* is an exemplary sequence diagram 100 for storing a node group object 48 in a LDAP data repository 26. When the node group object 48 is stored in a LDAP data repository 26 a LDAP node group object is created. The first method call-line 106, issuing from a vertical time-line 104 descending from a mxNodeGroupMgr box 102 to a mxPersistentDataManager box 102, represents a node group manager 44 starting the persistent data manager 40 by invoking a PDM implementation class constructor (e.g., MxPersistentDataManager( )). After the PDM implementation class is instantiated, the node group manager 44 requests that the persistent data manager 40 store a node group object 48 in the LDAP data repository 26, as shown by an addEntry( ) method call-line 106. The node group manager 44 preferably passes the node group object 48 to the persistent data manager 40 with the addEntry( ) method invocation.

The invoked addEntry( ) method in turn invokes a process to store the node group object 48 in the LDAP data repository 26. As part of the process, the attributes of the node group object 48 that are to be stored in the LDAP data repository (e.g., the persistent attributes) are determined. Likewise, the path or dn of the LDAP object to which the node group object 48 will be mapped is determined. As noted above, the persistent attributes and dn are dynamically determined for each object 48. The getApplicationName( ), getCategoryName( ), getCommonName( ) and getPersistentAttrs( ) method call-lines 106 represent methods of the node group object 48 invoked by the persistent data manager 40 to dynamically determine the dn and persistent attributes. In response to these method invocations, the node group object 48 returns the node group object 48 attributes with the application name (e.g., SysMgmt), the category or container name (e.g., node group container) and the common name of the node group object 48 (e.g., Oracle Server Group), in order to build the dn, as well as the persistent attributes. As described above, these methods may be persistent object interface 64 methods implemented by the node group object 48. The order of execution of these methods may be changed without deviating from the scope of the invention.

Referring again to FIG. 6*a*, a LDAPConnection( ) method call-line 106 indicates that the persistent data manager 40 instantiates the LDAP utility class 66. A getType( ) method call-line 106 indicates that the persistent data manager 40 invokes a Reflection::Field class method to get the data type of a node group object 48 persistent attribute. The data type for each of the persistent attributes is retrieved using reflection. Accordingly, the persistent data manager 40 repeats the getType( ) method invocation until the data type for each of the persistent attributes is retrieved. The dashed-line pointing from Reflection::Field class time-line 104 to the PDM implementation class 62 time-line 104 indicates that the Reflection::Field class returns control to the persistent data manager 40.

A getMethod( ) method call-line 106 indicates that the persistent data manager 40 invokes a Reflection::Method class method to get a method name of the node group object 48 get method to retrieve one of the persistent attributes. Method names for get methods to retrieve each of the persistent attributes are retrieved using reflection. Accordingly, the persistent data manager 40 repeats the getMethod( ) method invocation until the method name for each of the persistent attributes is retrieved.

A getMemberObjects( ) method call-line 106 indicates that the persistent data manager 40 invokes the get methods, retrieved above, to get the values of all of the persistent attributes of the node group object 48. Once all the persistent attributes of the node group object 48 are retrieved, the persistent data manager 40 can store the node group object 48 in the LDAP data repository 26 by mapping the persistent attributes to corresponding LDAP attributes of a LDAP object. Referring to FIG. 6*a*, an add( ) method call-line 106 indicates that the persistent data manager 40 invokes a LDAP utility class 66 method to add the node group object 48 to the LDAP data repository 26. The persistent data manager 40 passes the mapped persistent attributes' values, and the dn determined above, to the LDAP utility class 66 with the add( ) method invocation. The LDAP utility class 66 preferably executes the LDAP API(s) necessary to store the mapped persistent attributes' values in the LDAP data repository 26.

As shown by the dashed-line labeled add( ) pointing from the LDAP utility class time-line 104 to the persistent data manager 40 time-line 104, and the addEntry( ) dashed-line pointing from the persistent data manager time-line 104 to the node group manager time-line 104, the LDAP utility class 66 returns control to the persistent data manager 40, which in turn returns control to the node group manager 44, when the process of storing the node group object 48 in the LDAP data repository 26 is complete.

FIG. 6*b* is an exemplary sequence diagram 101 for reading a stored node group object from a LDAP data repository 26. The persistent attribute values of an empty node group object 48 would have been previously stored in corresponding LDAP attributes in the LDAP data repository 26. Much of the method invocations are the same in the sequence diagram 101 as in the sequence diagram 100 for storing a node group object 48. In FIG. 6*b*, the node group manager 44 invokes a PDM implementation class 62 method to read the node group object 48 entry in the LDAP data repository 26, as indicated by the readEntry( ) method call-line 106. The invoked readEntry( ) method in turn invokes a process retrieve the node group object 48 persistent attribute values from the LDAP data repository 26.

As a part of that process, the persistent data manager 40 invokes the node group 48 methods to determine the persistent attributes and the dn for the persistent attribute values in the LDAP data repository 26. The getApplicationName( ), getCategoryName( ), getCommonName( ) and getPersistentAttrs( ) method call-lines 106 represent these invoked methods. After instantiating LDAP utility class 66, the persistent data manager 40 invokes a LDAP utility class 66 method to read the persistent attribute values from the LDAP data repository 26. This is indicated by read( ) method call-line 106. The persistent data manager 40 preferably passes the dn for the persistent attribute values (i.e., the dn for the LDAP attributes mapped to by the persistent attributes) to the LDAP utility class 66 with the read( )

method invocation. The LDAP utility class 66 preferably executes the LDAP API(s) necessary to read the persistent attribute values from the location identified by the dn.

Once the persistent attribute values are retrieved, the persistent data manager 40 retrieves the data type and method names for persistent attributes, as described above and as indicated by the getType( ) and getMethod( ) method call-lines 106 shown in FIG. 6b. In the process illustrated by the sequence diagram 101, however, the method names are set methods, since the persistent attributes of the node group object are being populated or set with the persistent attribute values retrieved from the LDAP data repository 26.

Once the method names for the set methods of the persistent attributes have been retrieved using reflection, the persistent data manager 40 sets all of the persistent attributes using these set methods and the persistent attribute values retrieved from the LDAP data repository 26. This is indicated by the setMemberObjects( ) method call line 106 from the persistent data manager time-line 104 to the node group time line 104. Once the persistent attributes of the node group object have been set, the persistent data manager preferably returns control to the node group manager 44.

The persistent data manager 40 can perform processes similar to those shown in FIGS. 6a and 6b for adding and reading different types of Java objects 48 to and from the LDAP data repository 26. By dynamically determining the persistent attributes and dn of the objects 48 and using reflection to determine the values of the persistent attributes, the persistent data manager 40 maintains the flexibility to handle numerous types of objects 48.

Some of the objects and classes discussed herein are named with a prefix "mx". The mx prefix is indicative of the application utilizing the objects and classes (e.g., the SCM 12) and is merely exemplary. Indeed, the names of classes, objects and methods discussed herein are exemplary, are not intended to be limiting, and are merely used for ease of discussion.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A computer implemented method for storing objects to a lightweight directory access protocol repository, comprising:

dynamically determining persistent attributes associated with an object in response to a request to store the object in a lightweight directory access protocol ("LDAP") repository, wherein the object includes attributes, the persistent attributes are a subset of the attributes, and the persistent attributes each comprise a persistent attribute value;

determining a path from information in the object, wherein the path identifies a location in the LDAP repository to store the object and the path identifies a LDAP object that corresponds to the object;

retrieving one or more persistent attribute values associated with the object; and storing the object in the LDAP repository so that the persistent attributes are stored in a format that is useable by other applications, wherein storing the object in the LDAP repository comprises:

mapping the persistent attributes to LDAP attributes, wherein the LDAP attributes are associated with the LDAP object identified by the determined path;

populating the LDAP attributes with the one or more persistent attribute values; and passing the LDAP attributes populated with the one or more persistent attribute values to the LDAP repository.

2. The method of claim 1, wherein the persistent attributes each have a name and wherein mapping the persistent attributes to LDAP attributes comprises adding a prefix to the persistent attribute name.

3. The method of claim 2, wherein the prefix identifies an object-oriented programming application and an organization.

4. The method of claim 1, wherein the one or more persistent attribute values are passed to the LDAP repository as an LDAP object comprising the LDAP attributes and the one ore more persistent attribute values.

5. The method of claim 1, wherein the object is used in an object-oriented programming application and the object-oriented programming application has a name and the object has a name and wherein the path includes the object-oriented programming application name, a container name and the object name.

6. The method of claim 1, wherein the object represents one of the following: a user, a node, a node group, a role or a tool.

7. The method of claim 1, wherein the objects are Java objects.

8. The method of claim 5, wherein the object-oriented programming application is implemented in Java.

9. The method of claim 8, wherein the one or more persistent attribute values are retrieved from the object using Java reflection.

10. A computer readable storage medium containing instructions for storing objects to a lightweight directory access protocol repository, by:

dynamically determining persistent attributes associated with an object in response to a request to store the object in a lightweight directory access protocol ("LDAP") repository, wherein the object includes attributes, the persistent attributes are a subset of the attributes, and the persistent attributes each comprise a persistent attribute value;

determining a path from information in the object, wherein the path identifies a location in the LDAP repository to store the object and the path, identifies a LDAP object that corresponds to the object;

retrieving one or more persistent attribute values associated with the object; and storing the object in the LDAP repository so that the persistent attributes are stored in a format that is useable by other applications, wherein storing the object in the LDAP repository comprises:

mapping the persistent attributes to LDAP attributes, wherein the LDAP attributes are associated with the LDAP object identified by the determined path;

populating the LDAP attributes with the one or more persistent attribute values; and passing the LDAP attributes populated with the one or more persistent attribute values to the LDAP repository.

11. The computer readable storage medium of claim 10, wherein the objects are Java objects.

12. The computer readable storage medium of claim 10, wherein the object is used in an object-oriented programming application and the object-oriented programming application is implemented in Java and the one or more persistent attribute values are retrieved from the object using Java reflection.

13. A computer system that supports storing objects to a lightweight directory access protocol repository, comprising:
- a lightweight directory access protocol ("LDAP") repository;
- a processor that runs an object-orient programming application, wherein the object-oriented programming application generates:
  - an object, wherein the object includes attributes and is used in an object-oriented programming application;
  - a persistent data manager, that acts as a layer between the object and the LDAP repository, wherein the persistent data manager stores the object in the LDAP repository by:
    - dynamically determining persistent attributes associated with the object in response to a request to store the object in the LDAP repository, wherein the persistent attributes are a subset of the attributes and the persistent attributes each comprise a persistent attribute value;
    - determining a path from information in the object, wherein the path identifies a location in the LDAP repository to store the object and the path identifies a LDAP object that corresponds to the object;
    - retrieving one or more persistent attribute values associated with the object; and
    - storing the object in the LDAP repository so that the persistent attributes are stored in a format that is useable by other applications, wherein storing the object in the LDAP repository comprises:
    - mapping the persistent attributes to LDAP attributes, wherein the LDAP attributes are associated with the LDAP object identified by the determined path;
    - populating the LDAP attributes with the one or more persistent attribute values; and
    - passing the LDAP attributes populated with the one or more persistent attribute values to the LDAP repository.

* * * * *

UNITED STATES PATENT AND TRADEMARK OFFICE
CERTIFICATE OF CORRECTION

| | | |
|---|---|---|
| PATENT NO. | : 7,107,595 B2 | Page 1 of 1 |
| APPLICATION NO. | : 09/827035 | |
| DATED | : September 12, 2006 | |
| INVENTOR(S) | : Humberto A Sanchez, II et al. | |

It is certified that error appears in the above-identified patent and that said Letters Patent is hereby corrected as shown below:

In column 3, line 62, after "SCM" insert -- 12 --.

In column 16, line 49, in Claim 10, after "path" delete ",".

Signed and Sealed this

Eighth Day of December, 2009

David J. Kappos
*Director of the United States Patent and Trademark Office*